US010185698B2

(12) United States Patent
Arikawa

(10) Patent No.: US 10,185,698 B2
(45) Date of Patent: Jan. 22, 2019

(54) ELECTRONIC DEVICE, COMPUTATIONAL PROCESSING METHOD AND STORAGE MEDIUM

(71) Applicant: CASIO COMPUTER CO., LTD., Shibuya-ku, Tokyo (JP)

(72) Inventor: Kazuhiko Arikawa, Hamura (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 192 days.

(21) Appl. No.: 15/199,380

(22) Filed: Jun. 30, 2016

(65) Prior Publication Data

US 2017/0004108 A1   Jan. 5, 2017

(30) Foreign Application Priority Data

Jul. 2, 2015   (JP) .................................. 2015-133841

(51) Int. Cl.
*G06F 15/02* (2006.01)
(52) U.S. Cl.
CPC ................................ *G06F 15/0225* (2013.01)
(58) Field of Classification Search
None
See application file for complete search history.

(56) References Cited

U.S. PATENT DOCUMENTS

| 5,886,910 | A | | 3/1999 | Onodera et al. | |
|---|---|---|---|---|---|
| 8,789,197 | B1 | * | 7/2014 | Wolfram | ................. G09C 5/00 380/279 |
| 2006/0179092 | A1 | * | 8/2006 | Schmookler | ............ G06F 7/535 708/204 |
| 2009/0240751 | A1 | * | 9/2009 | Renshaw | ............ G06F 3/04895 708/131 |
| 2015/0081750 | A1 | * | 3/2015 | Karoji | ..................... G06F 15/02 708/130 |
| 2015/0269115 | A1 | * | 9/2015 | Muraki | ............... G06F 15/0225 708/130 |

FOREIGN PATENT DOCUMENTS

| JP | 08227399 A | 9/1996 |
|---|---|---|
| JP | 09016525 A | 1/1997 |
| JP | 10049502 A | 2/1998 |

* cited by examiner

*Primary Examiner* — Michael D. Yaary
(74) *Attorney, Agent, or Firm* — Holtz, Holtz & Volek PC

(57) ABSTRACT

An electronic device includes a display, a memory and a processor being configured to: register a plurality of pieces of first computational data in input order; register at least one or more pieces of second computational data each time the second computational data is input, the at least one or more pieces of second computational data corresponding to the plurality of pieces of first computational data, and each piece of the second computational data including numerical value data and calculation data; when second computational data is registered, determine whether the registered second computational data is consistent with the first computational data in input order corresponding to the registered second computational data; when the registered second computational data is determined to be inconsistent with the first computational data, correct the first computational data; and resume the registration of the second computational data after the first computational data is corrected.

18 Claims, 11 Drawing Sheets

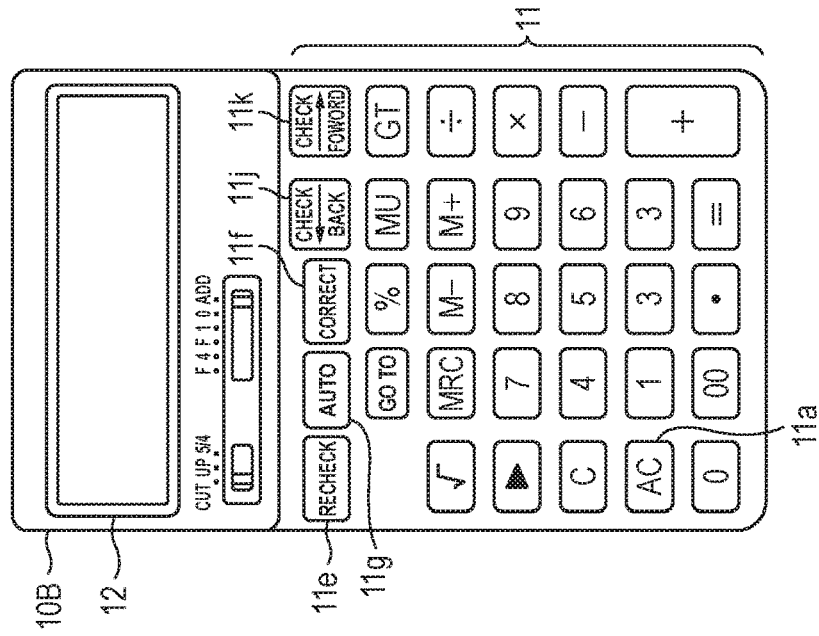
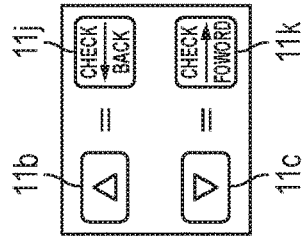
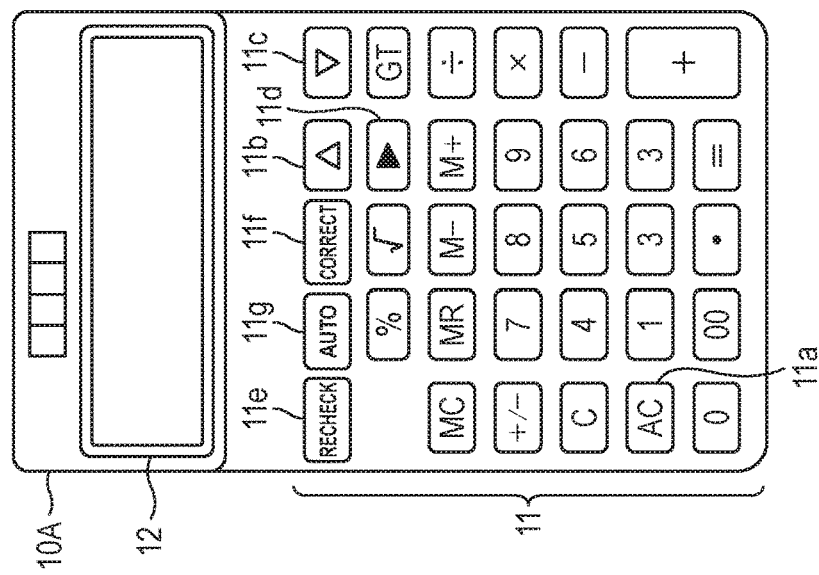

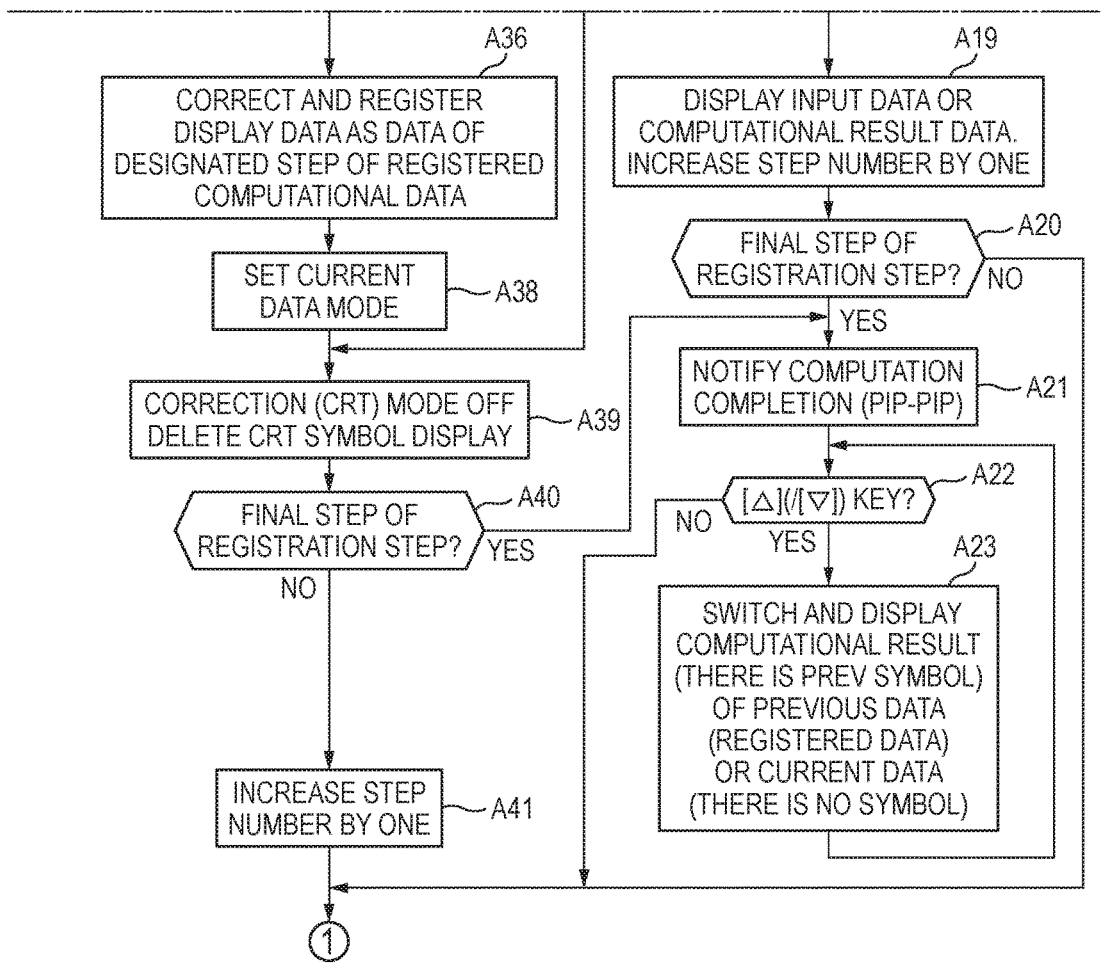

FIG. 6A (EXAMPLE) BUDGET ($)

| REGISTERED DATA | | |
|---|---|---|
| 001 | | 10 + |
| 002 | | 20 + |
| 003 | | 40 = |
| 004 | [ = ] | 70 |

TRANSPORTATION EXPENSE — 001
LUNCH — 002
DINNER — 003

FIG. 6B

| REGISTERED DATA (CORRECTION 1) | | |
|---|---|---|
| 001 | | 10 + |
| 002 | | 80 + |
| 003 | | 40 = |
| 004 | [ = ] | 130 |

TRANSPORTATION EXPENSE — 001
LUNCH — 002 — CORRECTION
DINNER — 003

FIG. 6C

| REGISTERED DATA (CORRECTION 2) | | |
|---|---|---|
| 001 | | 10 + |
| 002 | | 18 + |
| 003 | | 40 = |
| 004 | [ = ] | 68 |

TRANSPORTATION EXPENSE — 001
LUNCH — 002 — CORRECTION
DINNER — 003

FIG. 6D

| REGISTERED DATA (CORRECTION 3) | | |
|---|---|---|
| 001 | | 10 + |
| 002 | | 18 + |
| 003 | | 85 = |
| 004 | [ = ] | 113 |

TRANSPORTATION EXPENSE — 001
LUNCH — 002
DINNER — 003 — CORRECTION

COMPUTATIONAL RESULT WHERE DINNER WAS INCREASED TO $85

| CALCULATION VERIFICATION DATA (INTERMEDIATE) ||
|---|---:|
| 001 | 10 + |
| 002 | 80 + |
|  |  |
|  |  |

NOTIFICATION

| CALCULATION VERIFICATION DATA 1 (FINAL) |||
|---|---|---:|
| 001 |  | 10 + |
| 002 |  | 80 + |
| 003 |  | 40 = |
| 004 | [ = ] | 130 + |

| CALCULATION VERIFICATION DATA 1 (FINAL) |||
|---|---|---:|
| 001 |  | 10 + |
| 002 |  | 80 + |
| 003 |  | 40 = |
| 004 | [ = ] | 130 + |

IT IS POSSIBLE TO COMPARE AND DISPLAY COMPUTATIONAL RESULTS WHEN DECREASING LUNCH TO $18 AND WHEN INCREASING LUNCH TO $80

| CALCULATION VERIFICATION DATA 2 |||
|---|---|---:|
| 001 |  | 10 + |
| 002 |  | 5 + |
| 003 |  | 40 = |
| 004 | [ = ] | 55 |

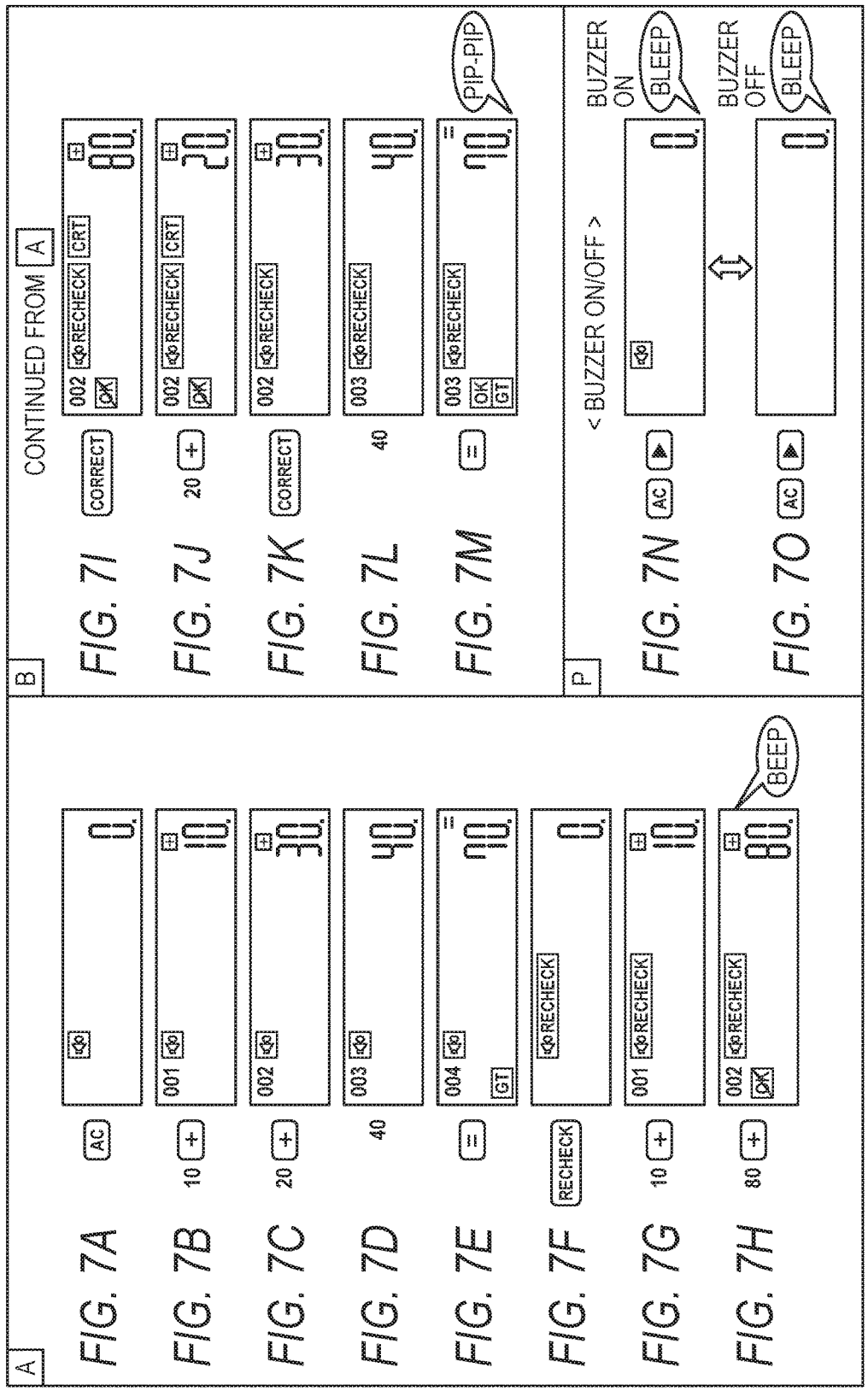

FIG. 9A  CONTINUED FROM [A]  [002 RECHECK] [Prev]  △  20.

FIG. 9B  [002 RECHECK] [CRT] [Prev]  CORRECT  20.

FIG. 9C  [002 RECHECK] [CRT] [Prev]  18 +  18.

FIG. 9D  [002 RECHECK] [CRT] [Prev]  CORRECT  90.

FIG. 9E  [003 RECHECK]  40  90.

FIG. 9F  [004 RECHECK] [OK/GT]  =  130.

FIG. 9G  [004 RECHECK] [Prev] [GT]  △  68.

FIG. 9H  [004 RECHECK] [OK/GT]  ▽ (OR △)  130.

FIG. 9I  CONTINUED FROM [E]  AC  [◇]  0.

FIG. 9J  ▽  [001 ◇] [REV]  10.

FIG. 9K  ▽  [002 ◇] [REV]  18.

FIG. 9L  ▽  [003 ◇] [REV]  40.

FIG. 9M  CORRECT  [003 ◇] [REV] [CRT]  40.

FIG. 9N  85  [003 ◇] [REV] [CRT]  85.

FIG. 9O  =  [003 ◇] [REV] [CRT] [OK/GT]  85.

FIG. 9P  CORRECT  AUTO  [004 ◇] [REV] [CRT] [OK/GT]  113.

(DATA OF 001 TO 004 IS AUTOMATICALLY SWITCHED AND DISPLAYED)

ELECTRONIC DEVICE, COMPUTATIONAL PROCESSING METHOD AND STORAGE MEDIUM

CROSS-REFERENCE TO RELATED APPLICATION

This application is based upon and claims the benefit of priority from the prior Japanese Patent Application No. 2015-133841, filed on Jul. 2, 2015, and the entire contents of which are incorporated herein by reference.

BACKGROUND OF THE INVENTION

1. Field of the Invention

The disclosure relates to an electronic device, a computational processing method, and a storage medium having a computational processing program recorded therein.

2. Description of the Related Art

In the related art, a calculation check calculator capable of displaying a computation history for check and correcting a part thereof for recalculation has been developed. Also, a twice pressing calculator having a calculation verification function, which can preserve a first computation history and compare the same with a second computation, has been developed.

Also, JP-A-H08-227399 discloses an electronic calculator which is configured to record previous data and current data, which are input for calculation, and notifies inconsistency when the previous data and the current data are not consistent with each other and ends a correction operation when a right input, which is the same as the previous input, is made.

SUMMARY OF THE INVENTION

In the conventional technologies, the first computational data is registered and compared with the second input computational data for calculation verification, and the second computational data is corrected. That is, even when it is necessary to correct the first input computational data while the second computational data is input, it is not possible to correct the first computational data registered already.

The disclosure has been made in view of the above situation, and an object of the disclosure is to provide an electronic device and a computational processing program capable of correcting first computational data while inputting second computational data for calculation verification of the first computational data.

An electronic device of the present invention includes a display, a memory and a processor. The processor is configured to: register a plurality of pieces of first computational data in input order, each piece of the first computational data including numerical value data input by a user's operation and calculation data input by a user's operation; register at least one or more pieces of second computational data each time the second computational data is input, the at least one or more pieces of second computational data corresponding to the plurality of pieces of first computational data registered in the input order, and each piece of the second computational data including numerical value data input by a user's operation to verify the first computational data and calculation data input by a user's operation to verify the first computational data; when at least one piece of second computational data is registered, determine whether the registered second computational data is consistent with the first computational data in input order corresponding to the registered second computational data; when the determination determines that the registered second computational data is inconsistent with the first computational data, correct the first computational data determined as inconsistent with the registered second computational data, by a user's operation; and resume the registration of the second computational data after the first computational data is corrected.

According to the disclosure, it is possible to correct the first computational data while inputting the second computational data for calculation verification of the first computational data.

BRIEF DESCRIPTION OF THE DRAWINGS

FIGS. 1A, 1B and 1C are front views and a schematic view depicting an outward configuration of an electronic device according to an illustrative embodiment.

FIGS. 6A through 6H illustrate specific numerical values of the computational processing in the electronic calculator according to the illustrative embodiment.

FIGS. 7A through 7O illustrate a specific display example of the computational processing in the electronic calculator according to the illustrative embodiment.

FIGS. 8A through 8N illustrate a specific display example of the computational processing in the electronic calculator according to the illustrative embodiment.

FIGS. 9A through 9P illustrate a specific display example of the computational processing in the electronic calculator according to the illustrative embodiment.

DETAILED DESCRIPTION OF THE PREFERRED EMBODIMENTS

Figure 2:
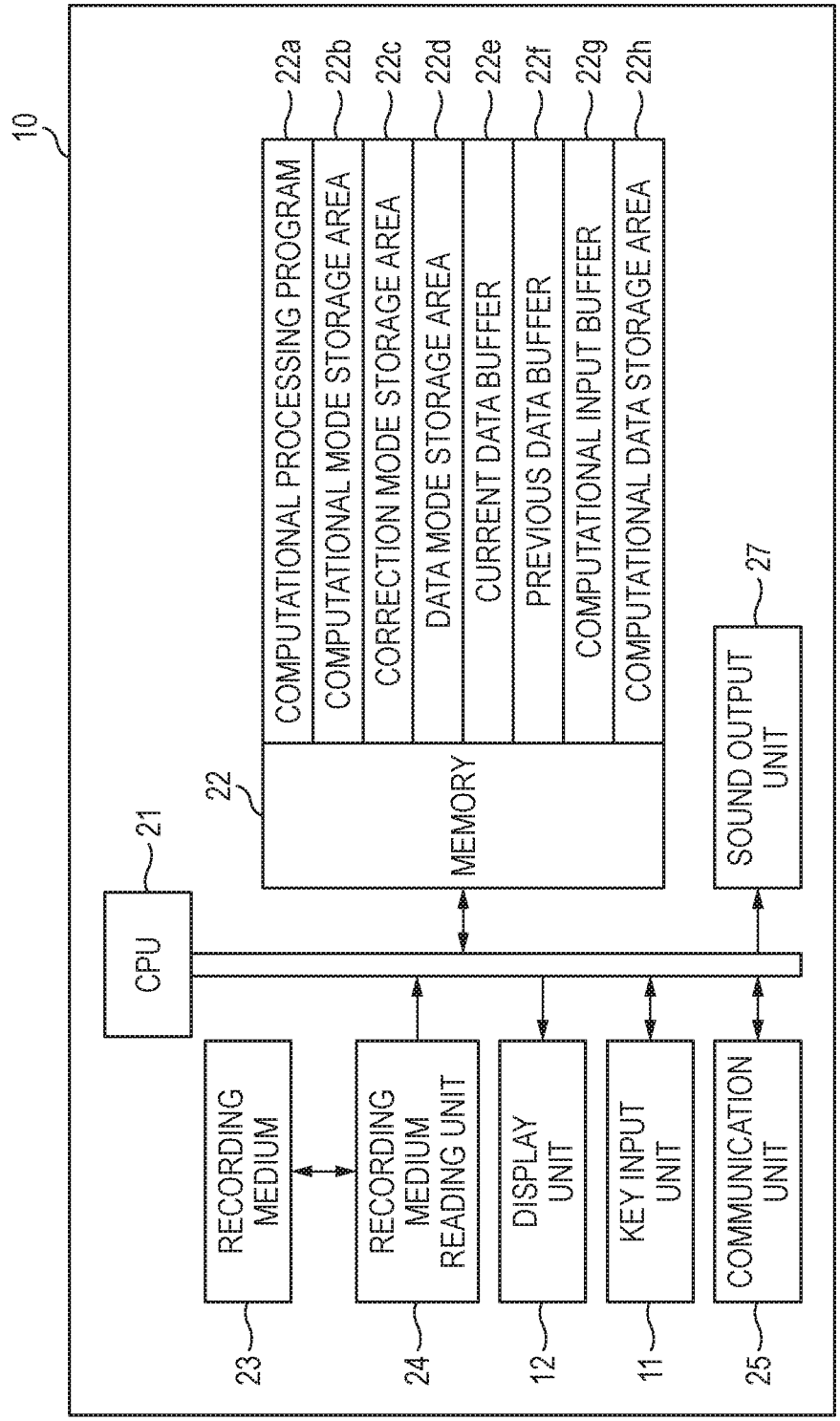
FIG. 2 is a block diagram depicting a configuration of an electronic circuit of the electronic calculator according to the illustrative embodiment.

Hereinafter, an illustrative embodiment of the disclosure will be described with reference to the drawings.

FIGS. 1A and 1B are front views depicting an outward configuration of an electronic device according to an illustrative embodiment. In the illustrative embodiment, the electronic device is implemented as electronic calculators 10A, 10B dedicated for computation.

In the meantime, the electronic device can also be configured as a personal computer, a tablet type computer, a smart phone, a portable phone, a touch panel type PDA (personal digital assistants), an electronic book, a portable gaming machine and the like, which have a computational function (a computational processing program is mounted therein), in addition to the electronic calculators 10A, 10B. Also, an electronic device having no physical keys (buttons) mounted thereon, unlike the electronic calculator 10, is configured to display the same software keyboard as the keys of the electronic calculator 10, and to execute computational processing in accordance with a key operation on the software keyboard.

The electronic calculators 10A, 10B shown in FIGS. 1A and 1B have different keys mounted on housings and can execute substantially the same processing. The electronic calculator 10A shown in FIG. 1A is first described.

A front surface of the housing of the electronic calculator 10A is provided with a key input unit 11 including a plurality of keys and a display unit 12.

The key input unit 11 is provided with numerical value input keys, calculation keys, and function keys. The numerical value input keys include numeric keys of [00] and [0] to [9], a decimal key [.], an [MR] key for displaying memory contents, and the like, for example. When the key is operated one or more times, numerical value data is input. The calculation keys include operator keys of [+] (addition), [−] (subtraction), [x] (multiplication) and [÷] (division), a calculation execution key [=], memory computation execution keys [M+]/[M−] (addition/subtraction of a computational result to/from the memory), and the like, for example. When any one of the keys is operated, calculation data (operator data, calculation execution data) is input. The function keys include an all clear key ([AC] key 11a), a clear key ([C] key), a plurality of memory keys ([MC]), a ground total key ([GT] key), a root key ([√] key), a percentage key [%], an upper key 11b, a lower key 11c, a shift key 11d and the like, for example.

Also, the key input unit 11 of the electronic calculator 10 is provided with a calculation verification key ([Re-check] key) 11e for instructing execution of a calculation verification function, a correction key ([correct] key) 11f for instructing correction of any one computational data (numerical value data or calculation data) of a series of computational data (a plurality of "numerical value data and calculation data") input already in the calculation verification function, and an auto review key ([AUTO] key) 11g.

The display unit 12 is configured by a dot matrix-type liquid crystal display unit. On the display unit 12, an equation input by a key operation on the key input unit 11 is displayed. Also, a computational mode under being set, a variety of setting states, and characters or symbols indicating input history steps of computational data and calculation verification data are displayed in a state display area provided along sides of the display unit 12.

The electronic calculator 10B shown in FIG. 1B is provided with keys to which the same functions as the electronic calculator 10A shown in FIG. 1A are allotted. The keys to which the same functions as the electronic calculator 10A are allotted are denoted with the same reference numerals as the electronic calculator 10A and the descriptions thereof are omitted. As shown in FIG. 1C, a check back key 11j and a check forward key 11k provided for the electronic calculator 10B are allotted with the same functions as the upper key 11b and the lower key 11c provided for the electronic calculator 10A.

FIG. 2 is a block diagram depicting a configuration of an electronic circuit of the electronic calculator 10 (the electronic calculator 10A, 10B) according to the illustrative embodiment. The electronic circuit of the electronic calculator 10 has a plurality of units configuring a computer, including a CPU 21.

The CPU 21 is configured to control operations of the respective units of the circuit and to execute a variety of calculation processing in accordance with key input signals from the key input unit 11 by executing a computational processing program 22a stored in a memory 22. The CPU 21 controls the operations of the respective units of the circuit in accordance with commands described in the computational processing program 22a and the software and the hardware operate in cooperation with each other, so that the electronic calculator 10 implements computational processing including processing, which is to be executed in accordance with a calculation verification function (which will be described later).

The computational processing program 22a may be stored in advance in the memory 22, may be read from an external storage medium 23 such as a memory card via a storage medium reading unit 24 or may be downloaded from a server on a communication network (including the Internet and the like) via a communication unit 25.

The memory 22 is configured to store therein the computational processing program 22a and is provided with areas for storing therein a variety of data, such as a computational mode storage area 22b, a correction mode storage area 22c, a data mode storage area 22d, a current data buffer 22e, a previous data buffer 22f, a computational input buffer 22g, a computational data storage area 22h and the like.

The computational mode storage area 22b is an area for storing therein any one of (1) a computation registration (usual) mode, (2) a calculation verification mode, and (3) a check (review) mode, which are mode data indicative of a current computational mode of the electronic calculator 10. (1) The computation registration (usual) mode is a mode where computational data including numerical value data and calculation data sequentially input in accordance with a user's key operation is sequentially stored (registered) in the computational data storage area 22h. In the meantime, the computation is executed by the input computational data, so that computational result data is displayed, and the computational result data is also stored (registered) in the computational data storage area 22h. (2) The calculation verification mode is a mode where respective computational data (numerical value data and calculation data) sequentially input in the calculation verification mode and the corresponding computational data (numerical value data and calculation data) of the plurality of computational data (numerical value data and calculation data) registered in the computation registration mode are sequentially compared and consistency or inconsistency therebetween is notified. (3) The check (review) mode is a mode where the respective computational data (numerical value data and calculation data) registered in the computational data storage area 22h and the computational result data are displayed.

The correction mode storage area 22c is an area for storing therein ON/OFF states of a correction mode during the calculation verification mode.

The data mode storage area 22d is an area for storing therein any one data mode of a previous (Prev) data mode where computational data of the calculation verification data, which is a correction target, is the corresponding computational data (previous data (first input data)) already registered and a current data mode where computational data, which is a correction target, is computational data (which is a second input when the input in the computation registration mode is a first input) input in the calculation verification mode.

The current data buffer 22e is a buffer for storing therein one set of computational data (current data), which includes the numerical value data and calculation data currently (second) input for calculation verification during the calculation verification mode and set as check targets. The current data buffer 22e is a buffer for storing therein computational data, which is to be input during the current data mode of the calculation verification mode. Therefore, a storage capacity of the current data buffer 22e is considerably smaller than the computational data storage area 22h for storing therein computational data already registered (which will be described later) (previous data: a series of computational data (numerical value data and calculation data) already registered).

The previous data buffer 22f is a buffer for storing therein computational data (one of numerical value data and calculation data), which is a current check target upon sequential comparison, of the computational data previously (first) input and set as a calculation verification target during the calculation verification mode.

The computational input buffer 22g is a buffer for storing therein computational data, which includes the numerical value data and calculation data input by a user's operation on the key input unit 11, and computational result data (numerical value data) associated with the input data. The computational input buffer 22g includes an area (X register) for storing therein first numerical value data, an area (Y register) for storing therein second numerical value data, and an area (register) for storing therein operator data, for example. The first numerical value data and the second numerical value data, which are to be stored in the computational input buffer 22g, are to be used for calculation associated with the operator data, and calculation result data up to the second numerical value data is to be obtained. The calculation result data is stored as the first numerical value data, and is used for calculation with next numerical value data (second numerical value data).

The computational data storage area 22h is an area for storing therein computational data of an equation, which is to be input for usual calculation in the computation registration mode. More specifically, the computational data, which includes the numerical value data and calculation data sequentially input in accordance with a user's key operation, is sequentially registered in the computational data storage area 22h. Also, the computation is executed by the input computational data, so that computational result data is displayed. The computational result data is also stored (registered) in the computational data storage area 22h. In the calculation verification mode, the corresponding computational data of the series of computational data stored in the computational data storage area 22h is read as previous data (registered data) and is stored (registered) in the previous data buffer 22f. In the computational data storage area 22h, a plurality of input steps (for example, 300 steps) is secured, and computational data, which includes the numerical value data and the calculation data input by the user's key operation, is sequentially stored (registered).

Meanwhile, in the illustrative embodiment, when calculation data is input by an operation on the calculation key, the numerical value data and calculation data, which are input before the input of the calculation data, are stored in the same input step.

Also, the electronic calculator 10 has a sound output unit 27 configured to output electronic sounds having a variety of patterns through the control of the CPU 21 based on the computational processing program 22a.

In the below, operations of the electronic calculator 10 of the illustrative embodiment are described.

Figure 3:
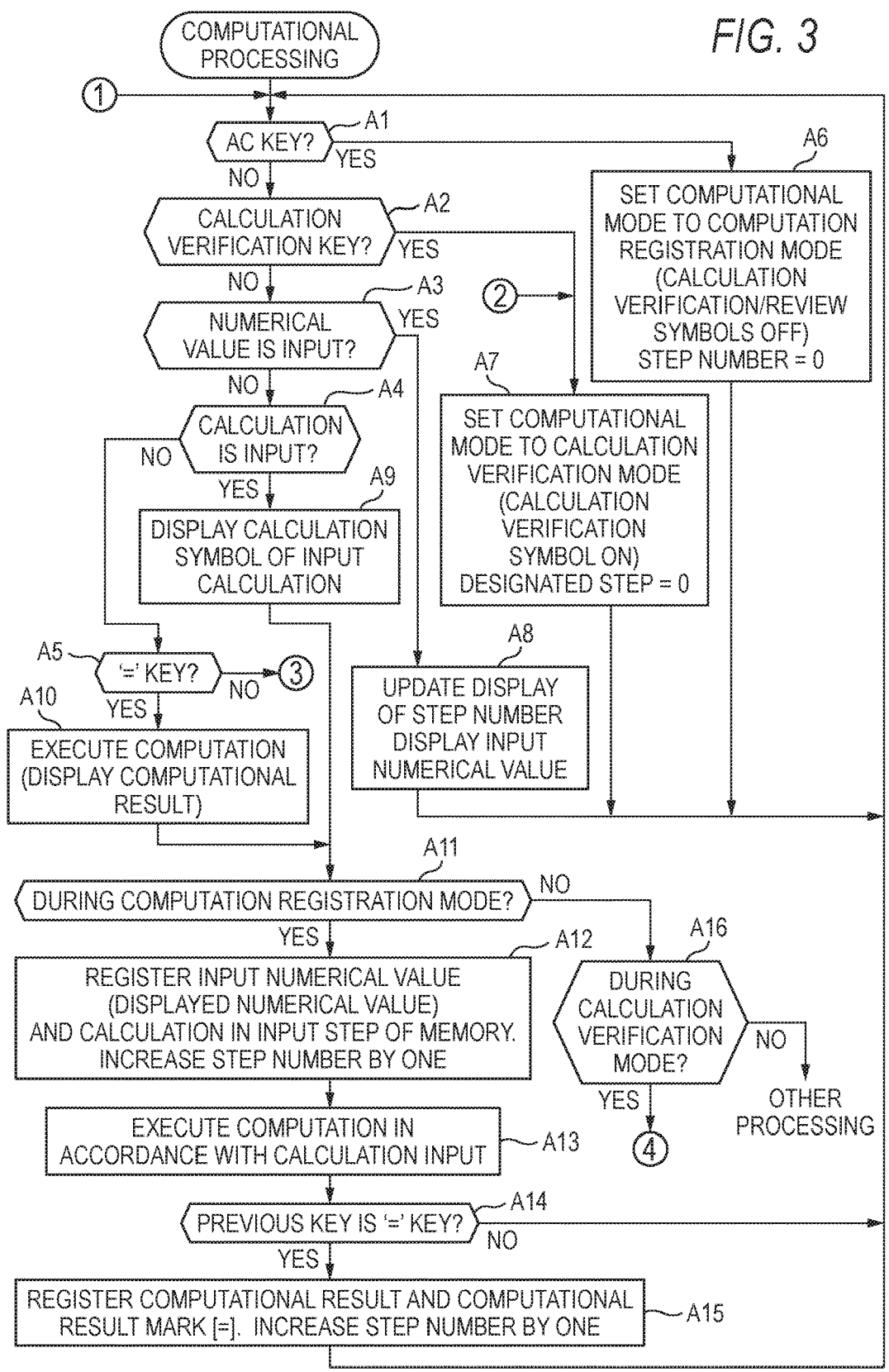
FIG. 3 is a flowchart depicting computational processing in the electronic calculator according to the illustrative embodiment.
Figure 4:
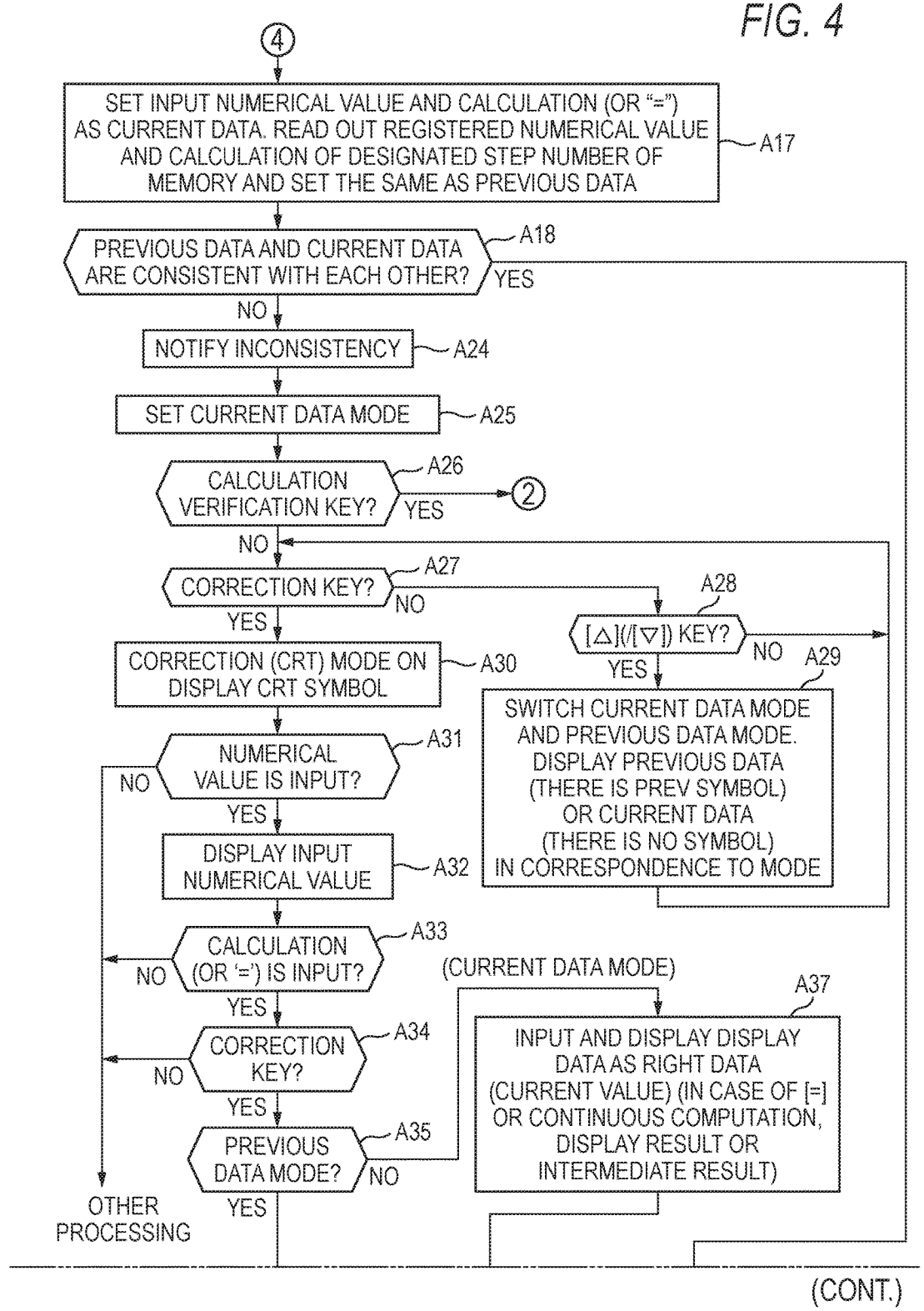
FIG. 4 is a flowchart depicting the computational processing in the electronic calculator according to the illustrative embodiment.
Figure 5:
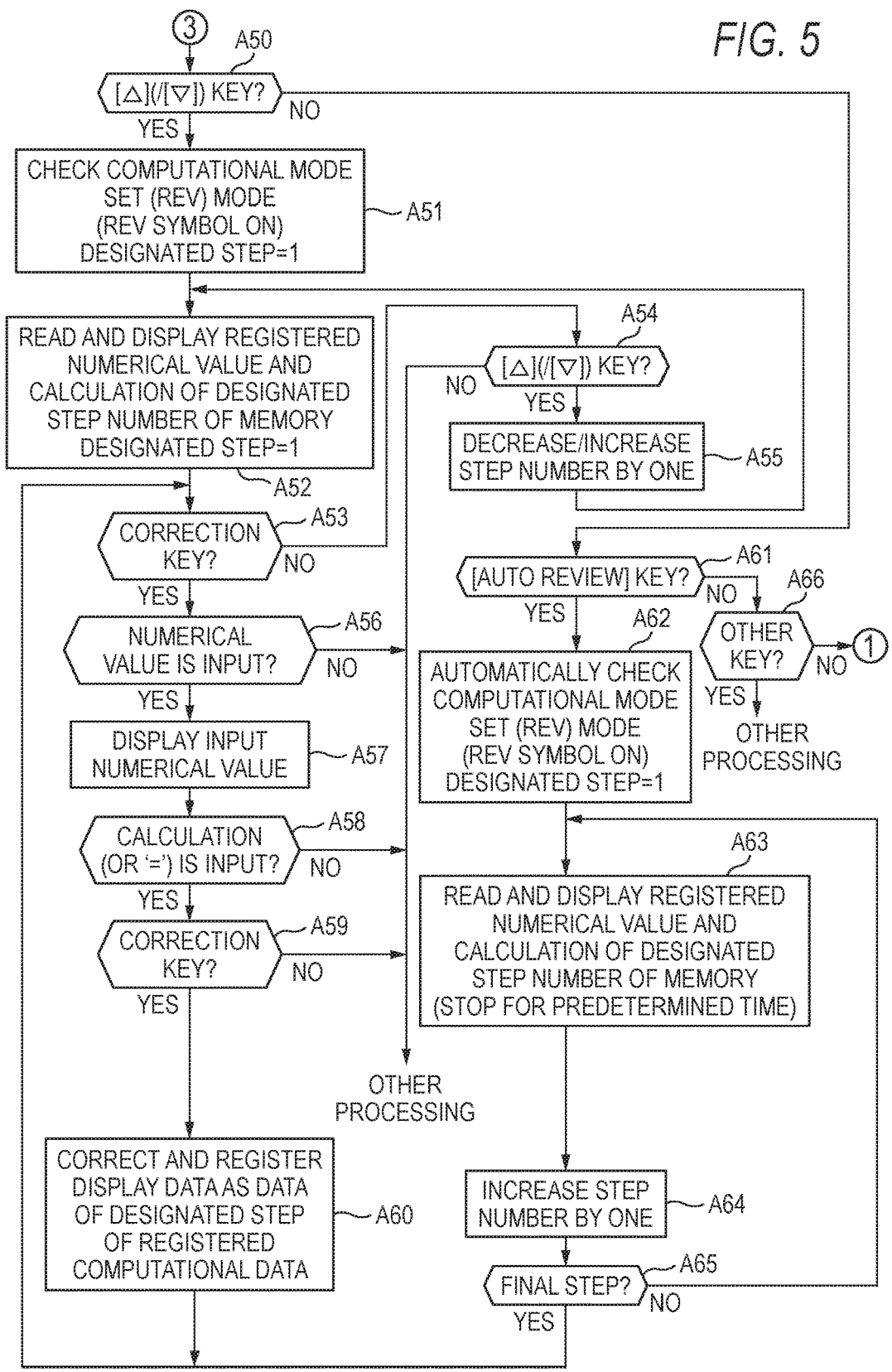
FIG. 5 is a flowchart depicting the computational processing in the electronic calculator according to the illustrative embodiment.

FIGS. 3 to 5 are flowcharts depicting computational processing in the electronic calculator 10 of the illustrative embodiment. FIG. 6 illustrates specific numerical values of the computational processing that is to be executed by the electronic calculator 10 of the illustrative embodiment. FIGS. 7 to 9 illustrate specific display examples of the computational processing that is to be executed by the electronic calculator 10 of the illustrative embodiment.

First, the user operates (presses) the [AC] key 12 so as to clear the display before starting the computation. When it is determined that the [AC] key 12 is operated (step A1: Yes), the CPU 21 sets the computational mode to the computation registration mode where the usual computation is to be executed. That is, the CPU 21 records the mode data indicative of the computation registration mode in the computational mode storage area 22b, and turns off the calculation verification symbol/review symbol in the state display area of the display unit 12. In the meantime, at an initial state, the step number is set to "000" (step A6).

Then, when the numerical value key is operated by the user so as to input the numerical value, which is the computation target (step A3: Yes), the CPU 21 inputs the numerical value data associated with the input-operated numerical value key and stores the same in the computational input buffer 22g. Also, the CPU 21 updates (+1) the step number to change the step number of the state display area and displays the input numerical value on the display unit 12 (step A8).

Subsequently, when it is determined that the calculation key is operated (step A4: Yes), the CPU 21 inputs the calculation data (operator data) associated with the input-operated calculation key, stores the same in the computational input buffer 22g, and displays a calculation symbol of the input calculation in the state display area of the display unit 12 (step A9).

In case of the computation registration mode (step A11: Yes), the CPU 21 registers the numerical value data and the calculation data, which have been stored in the computational input buffer 22g, in the computational data storage area 22h, and increases the step number by one so as to input next computational data (step A12). The CPU 21 executes the calculation on the basis of the input calculation data and the numerical value data already input, and displays an intermediate result of the calculation on the display unit 12 (step A13).

Thereafter, when the numerical value data and the calculation data are repeatedly input, the CPU 21 sequentially records the input numerical value data and calculation data in the computational data storage area 22h while increasing the step number, in the same manner.

When it is determined that a "=" (equal) key is operated by the user (step A5: Yes), the CPU 21 inputs the calculation data (calculation execution data) associated with the input-operated calculation key ("=" key), executes the computation associated with the numerical value data and calculation data (calculation execution data) input until then, and displays a computational result on the display unit 12 (step A10). The CPU 21 registers the numerical value data and calculation data (calculation execution data), which have been stored in the computational input buffer 22g, in the computational data storage area 22h, and increases the step number by one so as to input next computational data (step A12). The CPU 21 executes the calculation on the basis of the input calculation data and the numerical value data already input, and displays an intermediate result of the calculation on the display unit 12 (step A13).

Also, since the calculation data (calculation execution data) associated with the "=" key has been input (step A14: Yes), the CPU 21 stores the computational result data and the calculation data (calculation result mark), which are being displayed on the display unit 12, in the target step of the computational data storage area 22h, and increases the step number of the history input step by one for next input (step A15).

Herein, a specific example of the computational processing is shown. For example, as shown in FIG. 6A, a case where a budget of transportation expense, lunch and dinner is to be computed is exemplified.

FIG. 7A depicts a display example where the display of the display unit 12 has been cleared by the operation on the [AC] key 12. Meanwhile, in FIG. 7A, a symbol, which indicates that a buzzer mode where a warning sound or the like is to be output from the voice output unit 27 is set to an ON state, is shown. The buzzer mode is set to an ON state, as a default. As shown in FIGS. 7N and 7O, the buzzer mode can be switched between ON and OFF states by a simultaneous pressing operation on the [AC] key 11a and the shift key 11d. When the [AC] key 11a and the shift key 11d are pressed at the same time, the CPU 21 switches the ON/OFF states of the buzzer mode, and outputs a sound "bleep", which indicates that the switching of the buzzer mode has been completed, from the voice output unit 27.

FIG. 7B depicts a display example of the display unit 12 where the numerical value data "10" is input by the numerical value keys and the calculation data "+" is input by the "+" key (addition key). The CPU 21 displays the input numerical value data "10" on the display unit 12 and displays the calculation symbol "+" in the state display area, too. Then, the CPU 21 registers the numerical value data "10" and the calculation data "+" in the step number [001] of the computational data storage area 22h, and increases the step number to the step number [002] so as to input next computational data (step A12).

Subsequently, when the user operates on the numerical value keys "2" and "0" and the "+" key (addition key) to input the numerical value data and the calculation data, the CPU 21 displays the numerical value data "30", which is a computational result until then, and the calculation symbol "+", as shown in FIG. 7C. Then, the CPU 21 registers the numerical value data "20" and the calculation data "+" in the step number [002] of the computational data storage area 22h, and increases the step number to the step number [003] so as to input next computational data (step A12). Also, when the numerical value data "40" is input, the CPU 21 displays the input numerical value data "40", as shown in FIG. 7D. Then, when the computational execution is instructed by the operation on the "=" key, the CPU 21 displays the numerical value "70", which is a computational result, and displays the "=" symbol on the display unit 12, too, as shown in FIG. 7E. Then, the CPU 21 registers the numerical value data "40" and the calculation data "=" in the step number [003] of the computational data storage area 22h, and increases the step number to the step number [004] so as to input next computational data (step A12). Also, since the previous input is "=", the CPU 21 registers the computational result data "70" and the calculation data "computational result" in the step number [004] (refer to FIG. 6A).

By the above processing, the first computational data is input, and the computational result is obtained. The first computational data (registered data in FIG. 6A) is to be appropriately treated as the previous data, in the below descriptions.

Next, a calculation verification function of the illustrative embodiment is described.

First, when it is determined that the calculation verification key 11e ([Re-check] key) is operated (step A2: Yes), the CPU 21 sets the computational mode to the calculation verification mode (step A7), and displays a calculation verification symbol "RECHECK" in the state display area so as to explicitly indicate the calculation verification mode. Also, the CPU 21 sets the step number of the designated step to the initial value [000] for inputting new computational data for calculation verification. In the meantime, upon the shift to the calculation verification mode, the default (initial) data mode is the current data mode.

The user starts to input computational data (current data) for same computation so as to verify the previously executed computation (first computation) in the computation registration mode.

When it is determined that the numerical value key is operated by the user so as to input a numerical value, which is a computation target for calculation verification (step A3: Yes), the CPU 21 inputs the numerical value data associated with the input-operated numerical value key, and displays the input numerical value data on the display unit 12. Then, the CPU 21 updates the display of the step number to [001] (step A8). Subsequently, when it is determined that the calculation key is operated (step A4: Yes), the CPU 21 inputs the calculation data associated with the input-operated calculation key, and displays a calculation symbol of the input calculation in the state display area 16a of the display unit 12. When the continuous computation is being executed (during the computation), the CPU 21 executes the calculation associated with the calculation data, and displays an intermediate result of the calculation on the display unit 12 (step A13).

In case of the calculation verification mode (step A16: Yes), the CPU 21 stores the input numerical value data and calculation data in the current data buffer 22e. That is, the numerical value data and calculation data input in the calculation verification mode are treated as the current data. Also, the CPU 21 reads out the numerical value data and calculation data registered in the designated step number [001] of the computational data storage area 22h, and stores the same in the previous data buffer 22f (step A17).

The CPU 21 compares the numerical value and calculation code of the previous data stored in the previous data buffer 22f and the numerical value and calculation code of the current data input for calculation verification and stored in the current data buffer 22e. Herein, when it is determined that the previous data and the current data are consistent with each other (step A18: Yes), the CPU 21 displays the input data (current data), and also displays an intermediate result (numerical value) of the calculation, which is calculated on the basis of the code stored in the computational input buffer 22g, under the state where the calculation is being performed (the "=" key is not operated yet) (step A19).

When it is determined that the calculation verification is not over until the final step of the previous data (computational data) (step A20: Yes), the CPU 21 inputs the numerical value and the calculation code in accordance with the user's operation on the key input unit 11, and compares the same with the corresponding numerical value and calculation code of the previous data, in the above-described manner.

In this way, when it is determined by the calculation verification until the final step that there is no inconsistency (step A20: Yes), the CPU 21 notifies the computation completion (calculation verification completion) of the computational data, which was input for calculation verification (step A21). As an output form of the notification, an "OK" symbol indicative of the calculation verification completion may be displayed in the state display area of the display unit 12 or a sound of a specific pattern (for example, "pip-pip") may be output, for example. In the meantime, the notification may be made by any one of the display and the sound output, and the output form thereof may be selected in advance by the user.

Herein, when it is determined that the upper key 11b or the lower key 11c of the key input unit 11 is operated (step A22: Yes), the CPU 21 switches and displays the computational result of the previous data (computational data already registered) and the computational result of the current data (computational data) (step A23). That is, when the upper key 11*b* or the lower key 11*c* is operated while the calculation result (numerical value) of the current data is currently being displayed, the CPU 21 displays the calculation result of the previous data, instead of the calculation result of the current data. Also, the CPU 21 displays the preview (Prev) symbol on the display unit 12 so as to explicitly indicate that the calculation result of the previous data is being displayed.

Also, when the upper key 11*b* or the lower key 11*c* is operated while the calculation result of the previous data is currently being displayed, the CPU 21 displays the calculation result of the current data, instead of the calculation result of the previous data, and deletes the preview (Prev) symbol.

In this way, it is possible to simply switch and display the calculation result of the current data input in the calculation verification data and the calculation result of the previous data. In the above descriptions, since the calculation verification is correctly executed, the calculation results of the current data and the previous data are the same. The electronic calculator 10 of the illustrative embodiment can correct the current data and the previous data by different numerical values and calculations in the calculation verification mode, as described later. In this case, the calculation results of the current data and the previous data can be switched and displayed, so that it is possible to easily compare the corrected calculation results.

On the other hand, when it is determined that the previous data and the current data are not consistent (step A18: No), the CPU 21 notifies that the previous data and the current data are inconsistent (step A24). As an output form of the notification, an "NOT OK" symbol indicative of an error may be displayed in the state display area of the display unit 12 or a sound of a specific pattern (for example, "beep") may be output, for example. By the notification, the user can recognize that the key operation upon the previous (first) input of the computational data and the key operation upon the current (calculation verification (second)) input of the computational data are inconsistent, i.e., that the key operation is erroneous.

Herein, the CPU 21 sets the data mode to the current data mode. Then, when it is determined that the calculation verification key 11*e* is operated (step A26: Yes), the CPU 21 sets the computational mode to the calculation verification mode (step A7), and sets the step number of the designated step to the initial value "000" so as to input new computational data for calculation verification. That is, the computational data (current data) for calculation verification can be re-input from the first. In this case, the current data is input in the above-described manner by the user's operation.

Also, when it is determined that the correction ([correct]) key 11*f* is operated by the user (step A27: Yes), the CPU 21 sets the correction mode to the ON state and displays a correction symbol "CRT", which indicates that the correction mode is set, in the state display area of the display unit 12 (step A30).

Herein, when it is determined that the numerical value key is operated (step A31: Yes), the CPU 21 inputs the numerical value data associated with the input-operated numerical value key, and displays the input numerical value data on the display unit 12 (step A32). Subsequently, when it is determined that the calculation key is operated (step A33: Yes), the CPU 21 inputs the calculation data associated with the input-operated calculation key, and displays the calculation symbol of the input calculation data in the state display area of the display unit 12.

Also, when it is determined that the correction key 11*f* is operated (step A34: Yes), the CPU 21 determines that the input completion of the numerical value data or (and) the calculation data is instructed by the user. At this time, when it is determined that the data mode is the current data mode (step A35: No), the CPU 21 inputs the display data (the numerical value data and operator data input at the last time) as corrected right data (current value), and displays a numerical value, which is a calculation result based on the current value (step A37). After displaying the corrected calculation result, the CPU 21 turns off the correction mode, and deletes the correction symbol "CRT" in the state display area (step A39).

When it is determined that the step number of the designated step, which is a target of the calculation verification, is not the final step (step A40: No), the CPU 21 increases the step number by one (step A41), inputs the numerical value data and calculation data by the user, and compares the previous data (data in the previous data buffer 22*f*: the same data as the numerical value data and calculation data registered in the designated step number of the computational data storage area 22*h*) and the current data in the above-described manner.

On the other hand, when it is determined that the step number of the designated step is the final step of the computational data storage area 22*h* (step A40: Yes), the CPU 21 notifies the computation completion (calculation verification completion) of the computational data, which was input for calculation verification (step A21). Also, when the upper key 11*b* or the lower key 11*c* is operated, the CPU 21 displays a review on the current data including the corrected data, in the above-described manner (step A23).

In the above descriptions, the current data is corrected in the current data mode. However, the electronic calculator 10 of the illustrative embodiment may be configured to correct the previous data (the computational data of the designated step number already registered in the computational data storage area 22*h*: the same data as the data in the previous data buffer 22*0* in the calculation verification mode by switching the data mode to the previous data mode.

When it is determined that the current data input in the calculation verification mode is not consistent with the previous data (step A18: No), if it is determined that the upper key 11*b* or the lower key 11*c* is operated by the user (step A28: Yes), for example, the CPU 21 switches the current data mode to the previous data mode. Also, the CPU 21 displays the previous data (computational data) with the switching to the previous data mode, and displays the preview (Prev) symbol on the display unit 12 so as to explicitly indicate that the previous data is a processing target (step A29). In this way, the previous data can be subjected to a correctable state.

After the switching to the previous data mode, the CPU 21 inputs the numerical value and the calculation code in accordance with the user's operation and can correct the previous data (the computational data of the designated step number already registered in the computational data storage area 22*h*: updated to the same data as the data in the previous data buffer 220 in the same manner as the above-described current data mode (steps A27 to A33). After the previous data is corrected, when the correction ([correct]) key 11*f* is further operated by the user, the CPU 21 turns off the correction mode (returns to the usual calculation verification mode). At this time, since the operations are different depending on whether the correction mode is off during the previous mode or during the current mode, the CPU 21 executes following processing.

When it is determined that the correction ([correct]) key 11$f$ is operated by the user and an instruction to turn off the correction mode is issued in the previous data mode (step A34: Yes, step A35: Yes), the CPU 21 sets the previous data as the correction target (it is necessary to correct the previous data; error) and corrects the display data (the numerical value data and calculation data input at the last time) as the previous data (the computational data of the designated step number already registered in the computational data storage area 22*h*: the same data as the data in the previous data buffer 22*f*) (step A36). When the correction of the previous data is completed, the CPU 21 sets the data mode to the current data mode (step A38). The CPU 21 turns off the correction mode, deletes the correction symbol "CRT" in the state display area, and displays the computational result data (or the intermediate result data of the computation) obtained from the computational data of the target step of the current data on the display unit 12 (step A39). Thereby, after the correction of the previous data is completed, it is possible to continuously input a next step of the current data.

In this way, according to the calculation verification function of the electronic calculator 10 of the illustrative embodiment, it is possible to simply verify the computational data (previous data) already registered, which was first input, on the basis of the second re-input computational data (current data). When the inconsistency of the computational data is detected, it is possible to continue the calculation verification by correcting the first previous data or the second current data through the simple operation. For example, when the first previous data is erroneous and the second current data is right, it is possible to continue the calculation verification by correcting the first previous data. Also, when the first previous data is right and the second current data is erroneous, it is possible to continue the calculation verification by correcting the second current data.

Herein, a specific example of the computational processing that is to be carried out upon the execution of the calculation verification function is described.

For example, as shown in FIG. 7E, when the calculation verification key 11*e* ([Re-check] key) is operated at a state where the numerical value "70", which is the computational result, is displayed, the mode shifts to the calculation verification mode. FIG. 7F depicts a display example where the calculation verification symbol "RECHECK" is displayed as the mode shifts to the calculation verification mode.

Herein, when the numerical value "10" is input and the calculation code is input by the "+" key (addition key) for calculation verification of the previous data, the CPU 21 displays the input numerical value "10" and also displays the "+" symbol in the state display area, as shown in FIG. 7G.

Then, when the numerical value "80" different (wrong) from the previous data is input and the "+" key is operated, the CPU 21 outputs a sound 'beep" indicative of the inconsistency and displays the "NOT OK" (OK is deleted with a diagonal line) symbol because the previous data and the current data are inconsistent.

Figures 6E, 6F, 6G, 6H:

FIG. 6E depicts an example of data (current data) input for calculation verification corresponding to FIGS. 7F to 7H.

Subsequently, an example where the input (FIG. 7H) of the current data different from the previous data is to be corrected is described.

In this case, when the correction key ([correct] key) 11*f* is operated at the state of FIG. 7H, the CPU 21 turns on the correction mode, and displays the correction symbol "CRT", as shown in FIG. 7I.

Then, when the right numerical value "20" is input and the calculation data is input by the "+" key (addition key), the CPU 21 displays the input numerical value "20" and displays the "+" symbol in the state display area, too, as shown in FIG. 7J.

When the input for correction is completed and the correction key 11*f* is again operated, the CPU 21 displays a calculation result "30", which results from the input numerical value "20" and the addition calculation data (+), as shown in FIG. 7K. Subsequently, when the numerical value data "40" is input for calculation verification (FIG. 7L) and the "=" (equal) key is operated, the CPU 21 displays the input numerical value data "40", and also displays the numerical value data "70", which is a calculation result, as shown in FIG. 7M. Also, the CPU 21 displays the "OK" symbol, which indicates that the calculation verification has completed, and outputs the sound "pip-pip."

Next, an example where the input of the current data shown in FIG. 7H is to be corrected is described. Herein, the current data (computational data) input in the calculation verification mode is changed and used for computation of a new budget, for example.

In this case, when the correction key 11*f* is operated at the state of FIG. 7H, the CPU 21 turns on the correction mode, and displays the correction symbol "CRT", as shown in FIG. 8A.

Then, when the numerical value data "5" for change is input and the calculation data is input by the "+" key (addition key), the CPU 21 displays the input numerical value "5" data and the "+" symbol in the state display area, as shown in FIG. 8B.

When the input for change is completed and the correction key 11*f* is again operated, the CPU 21 displays a calculation result "15", which results from the input numerical value "5" and the addition calculation data (+), as shown in FIG. 8C. Subsequently, when the numerical value data "40" is input for calculation verification, the CPU 21 displays the input numerical value data "40" (FIG. 8D), and when the "=" (equal) key is operated, the CPU 21 displays the calculation result data "55", as shown in FIG. 8E. Also, the CPU 21 outputs the sound "pip-pip", which indicates that the calculation verification has completed. Herein, the current data is the computational data different from the previous data. That is, since the calculation verification has not been executed for the previous data, the CPU 21 does not display the "OK" symbol, which indicates that the calculation verification has completed.

FIG. 6H depicts an example of data (current data) input for calculation verification corresponding to FIGS. 8A to 8E. The numerical value shown in FIG. 6H indicates a budget sum when the lunch budget is changed from "20" to "5", for example.

Herein, when the upper key 11*b* or the lower key 11*c* is operated, the CPU 21 switches and displays the computational result data "70" of the previous data shown in FIG. 8F and the computational result data "55" of the current data shown in FIGS. 8E and 8G. When displaying the computational result data "70" of the previous data, the preview (Prev) symbol is displayed. In this way, the computational results of the previous data and the current data are switched and displayed, so that it is possible to simply compare the budget shown in FIG. 6A and the budget shown in FIG. 6H, for example.

Next, an example where the previous data is to be corrected in conformity to the current data is described. For example, it is assumed that the numerical values shown in FIG. 6F are input by the input of the current data.

In this case, when the upper key 11b is operated at the state of FIG. 7H (the state where the numerical value data "80" of the step number "002" is input), for example, the CPU 21 switches the data mode from the current data mode to the previous data mode, and displays the previous data (the step number "002"), as shown in FIG. 8H. In FIG. 8H, the numerical value data "20" of the previous data is displayed and the preview (Prev) symbol is also displayed.

Herein, when the correction key 11f is operated by the user, the CPU 21 turns on the correction mode, and displays the correction symbol "CRT", as shown in FIG. 8I.

Then, when the corrected numerical value data "80" is input and the calculation data is input by the "+" key (addition key), the CPU 21 displays the input numerical value data "80", and displays the "+" symbol in the state display area, too, as shown in FIG. 8J.

When the input for correction is completed and the correction key 11f is again operated by the user, the CPU 21 switches the data mode from the previous data mode to the current data mode, and deletes the preview (Prev) symbol, as shown in FIG. 8K. Also, the CPU 21 displays the calculation result "90" resulting from the input numerical value "80" up to the target step ("002") of the previous data and the addition calculation code (+).

Subsequently, when the numerical value data "40" is input and the "=" (equal) key is operated, the CPU 21 displays the input numerical value data "40" (FIG. 8L), and displays the numerical value data "130", which is a calculation result, as shown in FIG. 8M. Also, the CPU 21 displays the "OK" symbol, which indicates that the calculation verification has completed, and outputs the sound "pip-pip".

Herein, when the upper key 11b or the lower key 11c is operated, the CPU 21 switches and displays the computational result data "130" of the current data shown in FIG. 8M and the computational result data "130" of the previous data shown in FIG. 8N in which the previously corrected numerical value has been reflected. When displaying the computational result "130" of the previous data, the preview (Prev) symbol is displayed. In this way, the computational results of the corrected previous data and the current data are switched and displayed, so that it is possible to simply compare the calculation results of the numerical values shown in FIGS. 6B and 6F, for example.

Next, an example where the previous data is corrected to the computational data different from the current data is described. For example, it is assumed that the numerical values shown in FIG. 6G are input by the input of the current data (which is the same as FIG. 6F) and the previous data is corrected to the numerical value data shown in FIG. 6C. For example, the budget shown in FIG. 6A is changed to the budget (current data) shown in FIG. 6G and the budget shown in FIG. 6C (previous data), respectively, and the different budgets can be compared.

In this case, when the upper key 11b is operated at the state of FIG. 7H (the state where the numerical value data "80" of the step number "002" is input), for example, the CPU 21 switches the data mode from the current data mode to the previous data mode, and displays the previous data (the step number "002"), as shown in FIG. 9A. In FIG. 9A, the numerical value data "20" of the previous data is displayed, and the preview (Prev) symbol is also displayed.

Herein, when the correction key 11f is operated, the CPU 21 turns on the correction mode, and displays the correction symbol "CRT", as shown in FIG. 9B.

Then, when the corrected numerical value data "18" is input and the calculation code is input by the "+" key (addition key), the CPU 21 displays the input numerical value data "18" and displays the "+" symbol in the state display area, too, as shown in FIG. 9C.

When the input for correction is completed and the correction key 11f is again operated by the user, the CPU 21 switches the data mode from the previous data mode to the current data mode, and deletes the preview (Prev) symbol, as shown in FIG. 9D. Also, the CPU 21 displays an intermediate result data of the calculation (10+80+→) "90" resulting from the input numerical value data "80" up to the target step ("002") of the current data and the addition calculation code (+).

Subsequently, when the numerical value data "40" is input and the "=" (equal) key is operated, the CPU 21 displays the input numerical value data "40" (FIG. 9L), and displays the numerical value data "130", as shown in FIG. 9F. Also, the CPU 21 displays the "OK" symbol, which indicates that the calculation verification has completed.

Herein, when the upper key 11b or the lower key 11c is operated, the CPU 21 switches and displays the computational result data "130" of the current data shown in FIGS. 9F and 9H and the computational result data "68" of the previous data shown in FIG. 9G in which the previously corrected numerical value has been reflected. When displaying the computational result data "68" of the previous data, the preview (Prev) symbol is displayed. In this way, the computational results of the corrected previous data and the current data are switched and displayed, so that it is possible to simply compare the calculation results of the numerical values shown in FIGS. 6C and 6G, for example. Specifically, as shown in FIG. 6G, it is possible to compare and display estimated costs (summed costs) when changing the lunch budget to $18 and increasing the lunch budge to $80.

Next, a check (review) function of the illustrative embodiment is described.

When the [AC] key 12 is operated, the CPU 21 sets the computational mode to the computation registration mode (step A1: Yes). Thereafter, when the upper key 11b or the lower key 11c is operated (FIG. 5, step A50: Yes), the CPU 21 sets the computational mode to a check mode. The check mode is a mode where the computational data already registered in the computational data storage area 22h can be corrected while being checked in a unit of the numerical value data and the calculation data.

When the computational mode is set to the check mode, the CPU 21 displays a review (REV) symbol, which indicates a check mode state, in the state display area of the display unit 12. The CPU 21 sets the step number, which indicates the designated step in which the numerical value data and calculation data (check targets) are stored, to the initial value "001" (step A51).

The CPU 21 reads out and displays the numerical value data and calculation data recorded in the step number of the designated step of the computational data storage area 22h on the display unit 12 (step A52). Herein, when it is determined that the upper key 11b or the lower key 11c is operated (step A54: Yes), the CPU 21 updates the step number of the designated step (step A55), and reads out and displays the numerical value data and calculation data of the updated step number on the display unit 12 (step A52). That is, when the upper key 11b is operated, the CPU 21 displays the numerical value data and the calculation symbol, which have been input immediately before the numerical value being currently displayed, and when the lower key 11c is operated, the CPU 21 displays the numerical value data and the calculation symbol, which have been input immediately after the numerical value being currently displayed.

In this way, the user can sequentially read out the set of the numerical value data and the calculation data, which are included in the computational data already registered, by the operation on the upper key 11b or the lower key 11c, and display and check the contents of the calculation process on the display unit 12 (steps A52, A54 and A55).

When it is determined that the correction key 11f is operated at the state where the numerical value, which is a correction target, is displayed (step A53: Yes), the CPU 21 sets the correction mode and displays the correction symbol "CRT", which indicates the correction mode, in the state display area of the display unit 12 (step A53).

Herein, when it is determined that the numerical value key is operated (step A56: Yes), the CPU 21 inputs the numerical value data associated with the input-operated numerical value key, and displays the input numerical value data on the display unit 12 (step A57). Subsequently, when it is determined that the calculation key is operated (step A58: Yes), the CPU 21 displays the calculation data associated with the input-operated calculation key, and displays the calculation symbol of the input calculation data in the state display area of the display unit 12.

Also, when it is determined that the correction key 11f is operated (step A59: Yes), the CPU 21 determines that the input completion of the numerical value data and calculation data is instructed by the user. The CPU 21 inputs the display data (the numerical value and operator input at the last time) as the corrected right data, and corrects the same as the data of the target step of the registered computational data (step A60). The CPU 21 displays the computational result of the computational data, which includes the corrected numerical value data and the calculation data, on the display unit 12.

In this way, in the check (review) function, it is possible to read out and correct any numerical value from the computational data already registered. The user can perform the correction, as required, while checking the contents of the computational data.

Next, an automatic check (auto review) function of the illustrative embodiment is described. In the check function, the numerical value of the computational data already registered is switched and displayed in accordance of the user's operation on the upper key 11b or the lower key 11c. However, in the automatic check function, the display is switched without the user's operation.

When the [AC] key 12 is operated, the CPU 21 sets the computational mode to the computation registration mode (step A1: Yes). Thereafter, when the auto review key 11g is operated (FIG. 5, step A61: Yes), the CPU 21 sets the computational mode to an automatic check mode. When the computational mode is set to the automatic check mode, the CPU 21 displays the review (REV) symbol, which indicates a check mode state, in the state display area of the display unit 12. The CPU 21 sets the step number, which indicates the designated step in which the numerical value data and calculation data, which are the check targets, are stored, to the initial value "001" (step A62).

The CPU 21 reads out the numerical value data and calculation data, which are recorded in the step number of the designated step recorded in the computational data storage area 22h, and displays the same on the display unit 12 (step A63). When predetermined time (for example, 2 seconds) elapses, the CPU 21 increases the step number of the designated step by one (step A64), and when it is determined that the display of the final step is not completed (step A65: No), the CPU 21 reads out the numerical value data and calculation data of the updated step number and displays the same on the display unit 12 (step A63). That is, whenever the predetermined time elapses, the CPU 21 sequentially reads out the set of the numerical value data and calculation data included in the computational data already registered, and displays the contents of the computation process on the display unit 12 (steps A63 to A65).

In this way, according to the automatic check function, it is possible to read out and display the numerical value in order from the head of the computational data already registered. The user can check the contents of the computational data without performing the display change operation.

Meanwhile, in the automatic check function, the contents of the computational data are just displayed. However, like the check function, the contents of the computational data may be corrected by the user's operation. That is, when the correction key 11f is operated with any one numerical value of the computational data being displayed, the CPU 21 turns on the correction mode, and corrects the computational data by inputting the corrected numerical value data and the calculation data, in the above-described manner. When the correction completion is instructed by the operation on the correction key 11f, the CPU 21 resumes the display switching every predetermined time, and displays the numerical values from the corrected numerical value or the first numerical value of the computational data.

Thereby, it is possible to correct the computational data already registered while reducing the user's operation.

Herein, a specific example where the computational processing is carried out upon the execution of the check function is described. Herein, an example where the computational data (corrected already) already registered and shown in FIG. 6C is corrected to the numerical value shown in FIG. 6D by the check function is described.

FIG. 9I depicts a display example when the [AC] key 12 is operated by the user. The CPU 21 makes a clear state in accordance with the operation on the [AC] key 12 (the numerical value 0 is displayed).

Herein, when the lower key 11c is operated, for example, the CPU 21 sets the check mode, displays the review symbol and reads out and displays the numerical value data "10" and the calculation data "+" of the step number "001" of FIG. 6C, as shown in FIG. 9J. In the same manner, when the lower key 11c is continuously operated, the CPU 21 sequentially reads out and displays the numerical value data "18" and the calculation data "+" and the numerical value data "40" and the calculation data "=" of the step numbers "002" and "003", as shown in FIGS. 9K and 9L.

As shown in FIG. 9M, when the correction key 11f is operated at a state where the numerical value data "40" of the step number "003" is displayed, the CPU 21 turns on the correction mode, and displays the correction symbol "CRT". Herein, when the corrected numerical value data "85" of the step number "003" shown in FIG. 6D is input and the "=" (equal) key is operated, the CPU 21 displays the input numerical value data "85" (FIG. 9N), and displays the "=" symbol, as shown in FIG. 9O.

Herein, when the correction key 11f is again operated, the CPU 21 displays the calculation result data "113" associated with the corrected numerical value "85" and deletes the correction symbol "CRT", as shown in FIG. 9P.

In the meantime, as described above, after the computational data already registered is corrected to the numerical value shown in FIG. 6D, when the automatic check mode is set by the operation on the auto review key 11g, the CPU 21 reads out and displays the data of the respective step numbers "001" to "004" shown in FIGS. 9J K, 9N and 9P every predetermined time.

In this way, it is possible to correct the computational data already registered (FIG. 6C) in the check mode and to compare the same with the corrected computational result (FIG. 6D). Specifically, as shown in FIG. 6D, it is possible to obtain the estimated cost (summed cost) when the dinner budget is changed to $85. Therefore, by using the calculation verification function, it is possible to calculate and compare an estimation of a high budget shown in FIG. 6G, an estimation of a low budget shown in FIG. 6C, and an intermediate estimation between the high budget and the low budget shown in FIG. 6D.

In this way, according to the electronic calculator 10 of the illustrative embodiment, it is possible to correct the first computational data while inputting the second computational data (current data) so as to verify the first computational data (previous data) already registered. That is, since the calculation verification processing is used, it is possible to obtain the computational result by correcting a part of the computational data already registered with the simple operation and preparing the separate computational data. Therefore, even when it is necessary to prepare a plurality of estimations, as described above, it is not necessary to input all the respective computational data from the first.

In the meantime, the methods described in the illustrative embodiment, i.e., the respective methods such as the processing shown in the flowcharts of FIGS. 3 to 5 may be distributed as a computer-executable program with being stored in a storage medium such as a memory card (a ROM card, a RAM card and the like), a magnetic disc (a flexible disc, a hard disc and the like), an optical disc (a CD-ROM, a DVD and the like), a semiconductor memory and the like. A computer may be configured to read a program recorded in the external storage medium and operations thereof may be controlled by the program, so that the same processing as the functions described in the illustrative embodiment can be implemented.

Also, the program data for implementing each method may be transmitted as a form of a program code via a network (Internet), and the program data may be received from a computer (a server apparatus and the like) connected to the network (Internet), so that the same functions as the illustrative embodiment can be implemented.

In the meantime, the disclosure is not limited to the illustrative embodiment, and can be diversely modified at a state of the implementation without departing from the gist thereof. Also, the illustrative embodiment includes inventions in a variety of stages, and a variety of inventions can be extracted by appropriately combining a plurality of the disclosed configuration requirements. For example, if the described advantage is provided to solve the problems even when some of all the configuration requirements shown in the illustrative embodiment are omitted or some configuration requirements are combined, the configuration where the configuration requirements are omitted or combined can be extracted as an invention.

What is claimed is:

1. An electronic device comprising:
a display;
a memory; and
a processor,
wherein the processor is configured to:
each time an input operation of first combination data including first numerical value data and first calculation data is accepted, register, in an order of acceptance, each of the first combination data as one of a plurality of pieces of first computational data;
upon accepting an operation of a key for executing calculation, display, on the display, a first computational result obtained by using the plurality of pieces of first computational data, and register the obtained first computational result;
upon accepting an operation for setting to a calculation verification mode, set an operation mode to the calculation verification mode; and
before releasing the calculation verification mode upon accepting an operation for releasing the calculation verification mode, which is a different operation from the operation for executing calculation, under the set calculation verification mode:
each time an input operation of second combination data including second numerical value data and second calculation data is accepted, register each of the second combination data as one of at least one piece of second computational data, wherein the at least one piece of second computational data corresponds to at least one of the plurality of pieces of first computational data registered in the order of acceptance;
when the one of the at least one piece of second computational data is registered, determine whether the registered one of the second computational data is consistent with one of the registered first computational data corresponding to the registered one of the second computational data in the order of acceptance;
when the determination determines that one of the registered second computational data is inconsistent with the one of the registered first computational data, upon accepting an operation for turning on a correction mode, accept an input operation for correcting the one of the registered first computational data determined as inconsistent with the one of the registered second computational data;
resume the registration of the at least one piece of second computational data after the one of the registered first computational data is corrected;
upon accepting an operation of the key for executing calculation, without releasing the calculation verification mode, display, on the display, a second computational result obtained by using the at least one piece of second computational data, and register the obtained second computational result; and
after registering the obtained second computational result, when one of a plurality of obtained computational results is displayed on the display, upon accepting an operation for recalling a computational result, redraw the displayed obtained computational result from the one of the plurality of obtained computational results to another one of the plurality of the obtained computational results.

2. The electronic device according to claim 1, wherein the determination determines whether the registered one of the second computational data is consistent with the one of the registered first computational data corresponding to the registered one of the second computational data in the order of acceptance each time the at least one piece of second computational data is registered.

3. The electronic device according to claim 1, wherein the processor is further configured to:
after the one of the registered first computational data is corrected, display the one of the registered first computational data having been corrected on the display; and
after displaying the one of the registered first computational data having been corrected, display the one of the registered second computational data corresponding to the one of the registered first computational data which is determined as inconsistent with the one of the second computational data, on the display.

4. The electronic device according to claim 1, wherein the processor is further configured to:
when the determination determines that the registered one of the second computational data is inconsistent with the one of the registered first computational data, correct the one of the registered second computational data determined as inconsistent with the one of the registered first computational data, by a user's operation; and
resume the registration of the at least one piece of second computational data after the one of the registered second computational data is corrected.

5. The electronic device according to claim 1, wherein the processor is further configured to:
when the determination determines that the one of the registered second computational data is inconsistent with the one of the registered first computational data, display the one of the registered first computational data determined as inconsistent with the one of the registered second computational data; and
when the resumption resumes the registration of the at least one piece of second computational data, display an intermediate computational result obtained by computing the respective pieces of second computational data upon the resumption.

6. The electronic device according to claim 1, wherein the processor is further configured to:
after the first computational data is corrected, display a plurality of pieces of first computational data including the first corrected computational data, in input order.

7. A computational processing method in an electronic device including a display, the method comprising:
each time an input operation of first combination data including first numerical value data and first calculation data is accepted, registering, in an order of acceptance, each of the first combination data as one of a plurality of pieces of first computational data;
upon accepting an operation of a key for executing calculation, displaying, on the display, a first computational result obtained by using the plurality of pieces of first computational data, and registering the obtained first computational result;
upon accepting an operation for setting to a calculation verification mode, setting an operation mode to the calculation verification mode; and
before releasing the calculation verification mode upon accepting an operation for releasing the calculation verification mode, which is a different operation from the operation for executing calculation, under the set calculation verification mode:
each time an input operation of second combination data including second numerical value data and second calculation data is accepted, registering each of the second combination data as one of at least one piece of second computational data, wherein the at least one piece of second computational data corresponds to at least one of the plurality of pieces of first computational data registered in the order of acceptance;
when the one of the at least one piece of second computational data is registered, determining whether the registered one of the second computational data is consistent with one of the registered first computational data corresponding to the registered one of the second computational data in the order of acceptance;
when the determination determines that one of the registered second computational data is inconsistent with the one of the registered first computational data, upon accepting an operation for turning on a correction mode, accepting an input operation for correcting the one of the registered first computational data determined as inconsistent with the one of the registered second computational data;
resuming the registration of the at least one piece of second computational data after the one of the registered first computational data is corrected;
upon accepting an operation of the key for executing calculation, without releasing the calculation verification mode, displaying, on the display, a second computational result obtained by using the at least one piece of second computational data, and registering the obtained second computational result; and
after registering the obtained second computational result, when one of a plurality of obtained computational results is displayed on the display, upon accepting an operation for recalling a computational result, redrawing the displayed obtained computational result from the one of the plurality of obtained computational results to another one of the plurality of the obtained computational results.

8. The computational processing method according to claim 7, wherein the determination determines whether the registered one of the second computational data is consistent with the one of the registered first computational data corresponding to the registered one of the second computational data in the order of acceptance each time the at least one piece of second computational data is registered.

9. The computational processing method according to claim 7, further comprising:
after the one of the registered first computational data is corrected, displaying the one of the registered first computational data having been corrected on the display; and
after displaying the one of the registered first computational data having been corrected, displaying the one of the registered second computational data corresponding to the one of the registered first computational data which is determined as inconsistent with the one of the second computational data, on the display.

10. The computational processing method according to claim 7, further comprising:
when the determination determines that the registered one of the second computational data is inconsistent with the one of the registered first computational data, correcting the one of the registered second computational data determined as inconsistent with the one of the registered first computational data, by a user's operation; and resuming the registration of the at least one piece of second computational data after the one of the registered second computational data is corrected.

11. The computational processing method according to claim 7, further comprising:
when the determination determines that the one of the registered second computational data is inconsistent with the one of the registered first computational data, displaying the one of the registered first computational data determined as inconsistent with the one of the registered second computational data; and
when the resumption resumes the registration of the at least one piece of second computational data, displaying an intermediate computational result obtained by computing the respective pieces of second computational data upon the resumption.

12. The computational processing method according to claim 7, further comprising:
after the first computational data is corrected, displaying a plurality of pieces of first computational data including the first corrected computational data, in input order.

13. A non-transitory computer readable storage medium having stored therein instructions that, when executed by a device comprising a display and a memory, cause the device to:
each time an input operation of first combination data including first numerical value data and first calculation data is accepted, register, in an order of acceptance, each of the first combination data as one of a plurality of pieces of first computational data;
upon accepting an operation of a key for executing calculation, display, on the display, a first computational result obtained by using the plurality of pieces of first computational data, and register the obtained first computational result;
upon accepting an operation for setting to a calculation verification mode, set an operation mode to the calculation verification mode; and
before releasing the calculation verification mode upon accepting an operation for releasing the calculation verification mode, which is a different operation from the operation for executing calculation, under the set calculation verification mode:
each time an input operation of second combination data including second numerical value data and second calculation data is accepted, register each of the second combination data as one of at least one piece of second computational data, wherein the at least one piece of second computational data corresponds to at least one of the plurality of pieces of first computational data registered in the order of acceptance;
when the one of the at least one piece of second computational data is registered, determine whether the registered one of the second computational data is consistent with one of the registered first computational data corresponding to the registered one of the second computational data in the order of acceptance;
when the determination determines that one of the registered second computational data is inconsistent with the one of the registered first computational data, upon accepting an operation for turning on a correction mode, accept an input operation for correcting the one of the registered first computational data determined as inconsistent with the one of the registered second computational data;
resume the registration of the at least one piece of second computational data after the one of the registered first computational data is corrected;
upon accepting an operation of the key for executing calculation, without releasing the calculation verification mode, display, on the display, a second computational result obtained by using the at least one piece of second computational data, and register the obtained second computational result; and
after registering the obtained second computational result, when one of a plurality of obtained computational results is displayed on the display, upon accepting an operation for recalling a computational result, redraw the displayed obtained computational result from the one of the plurality of obtained computational results to another one of the plurality of the obtained computational results.

14. The non-transitory computer readable storage medium according to claim 13, wherein the determination determines whether the registered one of the second computational data is consistent with the one of the registered first computational data corresponding to the registered one of the second computational data in the order of acceptance each time the at least one piece of second computational data is registered.

15. The non-transitory computer readable storage medium according to claim 13, wherein the instructions cause the device to:
after the one of the registered first computational data is corrected, display the one of the registered first computational data having been corrected on the display; and
after displaying the one of the registered first computational data having been corrected, display the one of the registered second computational data corresponding to the one of the registered first computational data which is determined as inconsistent with the one of the second computational data, on the display.

16. The non-transitory computer readable storage medium according to claim 13, wherein the instructions cause the device to:
when the determination determines that the registered one of the second computational data is inconsistent with the one of the registered first computational data, correct the one of the registered second computational data determined as inconsistent with the one of the registered first computational data, by a user's operation; and
resume the registration of the at least one piece of second computational data after the one of the registered second computational data is corrected.

17. The non-transitory computer readable storage medium according to claim 13, wherein the instructions cause the device to:
when the determination determines that the one of the registered second computational data is inconsistent with the one of the registered first computational data, display the one of the registered first computational data determined as inconsistent with the one of the registered second computational data; and
when the resumption resumes the registration of the at least one piece of second computational data, display an intermediate computational result obtained by computing the respective pieces of second computational data upon the resumption.

18. The non-transitory computer readable storage medium according to claim 13, wherein the instructions cause the device to:
after the first computational data is corrected, display a plurality of pieces of first computational data including the first corrected computational data, in input order.

* * * * *